US010754720B2

(12) United States Patent
Mahindru et al.

(10) Patent No.: US 10,754,720 B2
(45) Date of Patent: Aug. 25, 2020

(54) HEALTH CHECK DIAGNOSTICS OF RESOURCES BY INSTANTIATING WORKLOADS IN DISAGGREGATED DATA CENTERS

(71) Applicant: INTERNATIONAL BUSINESS MACHINES CORPORATION, Armonk, NY (US)

(72) Inventors: Ruchi Mahindru, Elmsford, NY (US); John A. Bivens, Ossining, NY (US); Min Li, San Jose, CA (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 16/143,430

(22) Filed: Sep. 26, 2018

(65) Prior Publication Data
US 2020/0097348 A1 Mar. 26, 2020

(51) Int. Cl.
*G06F 11/07* (2006.01)
*G06F 11/00* (2006.01)
(Continued)

(52) U.S. Cl.
CPC .......... *G06F 11/079* (2013.01); *G06F 11/004* (2013.01); *G06F 11/076* (2013.01);
(Continued)

(58) Field of Classification Search
CPC ............... G06F 11/004; G06F 11/0709; G06F 11/0754; G06F 11/0757; G06F 11/076;
(Continued)

(56) References Cited

U.S. PATENT DOCUMENTS 5,974,462 A * 10/1999 Aman ................. H04L 67/1008
709/223
6,230,183 B1 * 5/2001 Yocom ................. G06F 9/5061
718/105
(Continued)

FOREIGN PATENT DOCUMENTS

WO 2014090969 A3 6/2014
WO 2015088324 A2 6/2015

OTHER PUBLICATIONS

Google: Network Requirements for Resource Disaggregation Gao, P.X. et al.; 2016.
(Continued)

*Primary Examiner* — Gabriel Chu
(74) *Attorney, Agent, or Firm* — Griffiths & Seaton PLLC

(57) ABSTRACT

Embodiments for preemptive deep diagnostics of resources in a disaggregated computing environment. Respective resources from respective pools of resources of different types are assigned to compose a disaggregated server. A workload is executed by the respective resources within the disaggregated server while the respective resources of the disaggregated server are monitored by a monitoring task. Responsive to a first resource of the respective resources generating an alert from the monitoring task, the workload is instantiated to be concurrently performed by the first resource and a second resource of the respective resources while initiating a health check diagnostic operation on the first resource.

21 Claims, 13 Drawing Sheets

(51) Int. Cl.
*G06F 11/20* (2006.01)
*H04L 29/14* (2006.01)
*G06F 11/30* (2006.01)

(52) U.S. Cl.
CPC ........ *G06F 11/0709* (2013.01); *G06F 11/202* (2013.01); *G06F 11/3006* (2013.01); *H04L 69/40* (2013.01); *G06F 2201/86* (2013.01)

(58) Field of Classification Search
CPC .............. G06F 11/079; G06F 11/0793; G06F 11/1492; G06F 11/1479; G06F 11/20; G06F 11/202; G06F 11/2023; G06F 11/2028; G06F 11/2236; G06F 11/2242; G06F 11/2257; G06F 11/3006; G06F 2201/81; G06F 2201/845; G06F 2201/86; H04L 41/0659; H04L 41/0668; H04L 41/0677; H04L 41/16; H04L 67/1002; H04L 69/40

See application file for complete search history.

(56) References Cited

U.S. PATENT DOCUMENTS

| | | | |
|---|---|---|---|
| 6,571,359 B1 | 5/2003 | Padwekar et al. | |
| 6,615,366 B1* | 9/2003 | Grochowski | G06F 9/30076 712/1 |
| 7,343,515 B1 | 3/2008 | Gilbertson et al. | |
| 7,603,404 B2* | 10/2009 | Gebhart | G06F 9/5072 709/201 |
| 7,634,542 B1* | 12/2009 | Krause | G06F 9/5083 709/206 |
| 8,041,797 B2 | 10/2011 | Childress et al. | |
| 8,275,642 B2 | 9/2012 | Chan et al. | |
| 8,320,235 B2 | 11/2012 | Volkerink et al. | |
| 8,661,130 B2 | 2/2014 | Sonoda et al. | |
| 9,176,759 B1* | 11/2015 | Sahasranaman | G06F 9/45558 |
| 9,183,560 B2 | 11/2015 | Abelow | |
| 9,300,728 B1* | 3/2016 | Ananchaperumal | H04L 67/10 |
| 9,606,520 B2 | 3/2017 | Noboa et al. | |
| 9,849,364 B2 | 5/2017 | Tran et al. | |
| 9,813,379 B1 | 11/2017 | Shevade et al. | |
| 9,838,248 B1* | 12/2017 | Grammel | H04L 41/0681 |
| 10,437,506 B2 | 10/2019 | Koppolu et al. | |
| 10,613,962 B1 | 4/2020 | Delange | |
| 2002/0083166 A1* | 6/2002 | Dugan | H04M 3/4228 709/223 |
| 2002/0133491 A1 | 9/2002 | Sim et al. | |
| 2005/0124369 A1* | 6/2005 | Attar | H04W 24/08 455/522 |
| 2005/0240793 A1* | 10/2005 | Safford | G06F 9/30181 714/1 |
| 2006/0245411 A1 | 11/2006 | Chen et al. | |
| 2007/0043771 A1 | 2/2007 | Ludwig et al. | |
| 2010/0169030 A1 | 7/2010 | Parlos | |
| 2010/0205192 A1 | 8/2010 | Quadracci et al. | |
| 2010/0262975 A1* | 10/2010 | Reysa | G06F 9/4843 718/105 |
| 2013/0031424 A1 | 1/2013 | Srivastava et al. | |
| 2014/0006626 A1* | 1/2014 | Breiter | G06F 9/50 709/226 |
| 2014/0006627 A1* | 1/2014 | Arwe | H04L 41/022 709/226 |
| 2015/0227426 A1 | 8/2015 | Andrade Costa et al. | |
| 2015/0286514 A1 | 10/2015 | Ward | |
| 2015/0381426 A1 | 12/2015 | Roese et al. | |
| 2016/0034359 A1* | 2/2016 | Cabrera | G06F 11/3409 714/19 |
| 2016/0036924 A1 | 2/2016 | Koppolu et al. | |
| 2016/0164753 A1 | 6/2016 | Cimprich et al. | |
| 2016/0212506 A1 | 7/2016 | Norwood et al. | |
| 2016/0274948 A1 | 9/2016 | Kelly et al. | |
| 2016/0291876 A1 | 10/2016 | Alatorre et al. | |
| 2016/0359683 A1 | 12/2016 | Bartfai-Walcott et al. | |
| 2017/0295107 A1 | 10/2017 | Salapura et al. | |
| 2017/0295108 A1 | 10/2017 | Mahindru et al. | |
| 2017/0364426 A1* | 12/2017 | Blea | G06F 11/14 |
| 2018/0027703 A1 | 1/2018 | Adiletta et al. | |
| 2018/0046514 A1 | 2/2018 | Breakstone et al. | |
| 2018/0343169 A1* | 11/2018 | Stephens | G06F 9/5022 |
| 2019/0334795 A1 | 10/2019 | Terayama et al. | |
| 2020/0073717 A1 | 3/2020 | Hari | |
| 2020/0092404 A1* | 3/2020 | Wagmann | H04L 69/40 |

OTHER PUBLICATIONS ip.com: Health Check based on Resource Analysis for Delta Change in Hierarchy Software System Development Environment Anonymously; Jan. 17, 2018.
Protection of Diagnostics and Logging Data Anonymously; Jan. 6, 2012.
Google: Network Support for Resource Disaggregation in Next-Generation Datacenters Han. S. et al.; 2013.
ip.com: Method and Apparatus for Optimum and Pre-emptive Resource Utilization in a Shared, Distributed, Constrained and Unpredictable Environment IBM; Aug. 17, 2004.
System and Method for Preemptive Reservation of Resources for Bulk Data Ingest into a Database Anonymously; Jun. 1, 2015.
Apendix P—List of IBM related cases.

* cited by examiner

HEALTH CHECK DIAGNOSTICS OF RESOURCES BY INSTANTIATING WORKLOADS IN DISAGGREGATED DATA CENTERS

CROSS-REFERENCE TO RELATED APPLICATIONS

This Application is related to the following five Applications having U.S. application Ser. Nos. 16/143,418, 16/143,421, 16/143,424, 16/143,427, and 16/143,433, each filed on even date as the present Application.

BACKGROUND OF THE INVENTION

Field of the Invention

The present invention relates generally to large scale computing, and more particularly to performing preemptive resource health diagnostics and replacement thereof in distributed computing environments for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects, and hence, there is a fundamental need to enhance and improve upon the structures and systems supporting these services.

SUMMARY OF THE INVENTION

Various embodiments for preemptive deep diagnostics of resources in a disaggregated computing environment, by a processor, are provided. In one embodiment, a method comprises (a) assigning respective resources from respective pools of resources of different types to compose a disaggregated server; (b) executing a workload by the respective resources within the disaggregated server while the respective resources of the disaggregated server are monitored by a monitoring task; and (c) responsive to a first resource of the respective resources generating an alert from the monitoring task, instantiating the workload to be concurrently performed by the first resource and a second resource of the respective resources while initiating a health check diagnostic operation on the first resource.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
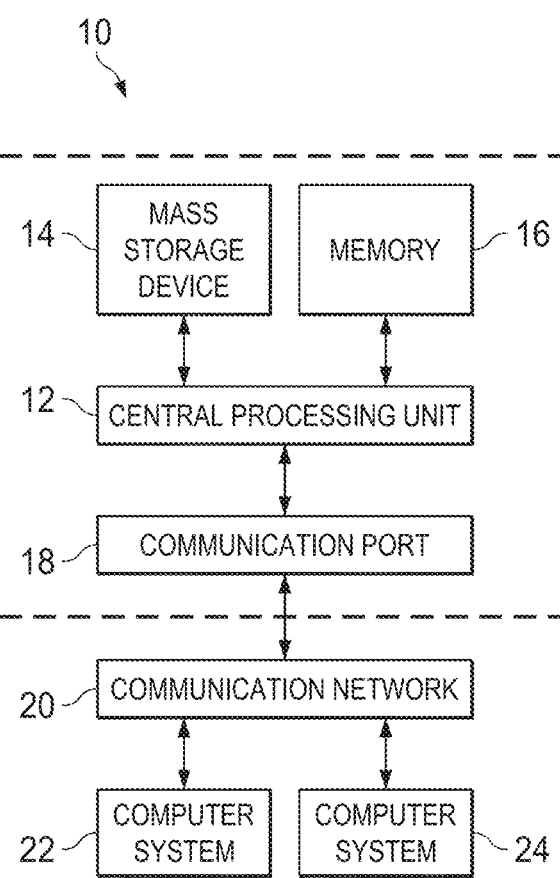
FIG. 1 is a block diagram depicting a hardware structure of a computing system, according to aspects of the present invention.

The techniques of this disclosure preferably are implemented within the context of a "disaggregated" computing system wherein a "disaggregated server"—sometimes referred to herein as a "server entity"—is dynamically constructed/composed or constitutes server resources selected from (or assigned from) shared server resource pools, namely, one or more of: a compute pool, a memory pool, an accelerator pool (e.g., a graphical processing unit (GPU) accelerator, a network accelerator, etc.), and a storage pool. As the nomenclature suggests, a "compute" pool typically constitutes physical processors (such as central processing units (CPUs)), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

It should be noted that the instant disclosure, for brevity, frequents the language of "resources". In an actual implementation of the present invention, the resources termed herein may be comprised of CPUs, GPUs, memory, storage devices, network devices, accelerator devices, etc. which are, again, generally pooled together in a shared resource pool fashion. Indeed, any hardware and/or software resources as commonly known in the art are to be construed interchangeably with "resources" or "resource types" as described herein, as one practicing the art would appreciate.

In traditional, non-disaggregated servers, resources such as CPUs, memory, accelerators, storage etc. are hardwired within a specific server. In enterprise environments, these servers are generally running highly critical workloads which cannot be interrupted to perform elaborate health diagnostics on the system. Therefore, the level of health check diagnostics performed on such servers cannot include more elaborate, intrusive tests that could have otherwise proactively discovered eminent resource failures. In these such cases of failure, the service fails abruptly with no warning or additional servers are used for resilient operation at an added acquisition and maintenance cost for both hardware and software resources.

Resource failures generally have behavioral patterns which ultimately lead to total failure in some cases. These failure patterns can be learned by applying known techniques like time-series analysis or from independent tests performed by others for each resource type. Learning from past pattern of failures, a prediction of future resource failure is made with a certain probability of accuracy. Servers are usually monitored for a number of failures (e.g., cyclic redundancy check (CRC) errors when accessing memory), however monitoring every metric associated with the behavior patterns which lead to failure can be time consuming, intrusive and may lead to performance degradation to the highly critical workload being executed. In a traditional server environment, based on initial reported failures, deeper testing and diagnostics can be performed, however these diagnostics are difficult to execute while the same servers are used to run their various regular workloads. Doing so, again, may degrade the performance of the existing workloads while deep diagnostics are running.

Because of the unpracticality, in traditional servers, of performing these deep diagnostics to proactively identify the potential resource failure and take an appropriate remediation action, such as replacing the server or the affected resources in a timely manner, these unforeseen behavior patterns may lead to catastrophic scenarios. Furthermore, traditional servers cannot allow replacement of certain resources while the workloads are running, with minimal disruption. For example, in a traditional (fixed) server, typically to replace memory or processors, the server needs to be shut down and the workload(s) executing thereon need to be migrated to other servers or a hot standby redundant server needs to be employed to take over the function of the primary server while the primary server is under maintenance. This increases the expense to provide reliable execution for those workloads.

As will be further discussed, following, in a disaggregated environment, the server entity is composed of one or more resources selected from one or more resource pools and these resources may be interchanged into the composed server entities freely, dynamically, and in substantially real time. This flexibility vastly improves the efficiency to replace suspected faulty resources for further extensive checking without disturbing the server operation and the possibly critical workloads executing thereon. Therefore, diagnosis of potential failing system resources can be performed much more effectively in a disaggregated system by quickly switching in and out resources to perform various deep diagnostics (including learning and matching failure patterns of certain resource behavior) without disturbing the workloads running on the disaggregated system.

Accordingly and within the context of a disaggregated computing environment, a system is considered that detects and learns failure patterns systematically identified for each resource, provides various types of alerts related to the monitored behavior of each resource (based on the learned failure patterns), and determines the urgency with which the resources may need to be replaced based on the criticality of the workloads running on the affected resources. Subsequently, the system may take appropriate action to allocate fresh, healthy resources to the workload, isolate the affected or suspicious resource from its resource pool, and/or swap resources between alternate servers to thereby run deeper health diagnostics on the suspicious resource.

In this way, the disclosed system uses the disaggregated datacenter architecture to quickly perform health check diagnostics on suspicious resources without disturbing workload operations. For the suspected resources in which a non-permanent failure is identified, the proposed system dynamically estimates the particular resource's expected time to failure (ETTF) in context of the workload types (e.g., CPU-bound or memory-bound workloads) that will be using the tested suspicious resources. The newly tested resources are returned to the available resource pool with expected failure time tags and are provisioned for less critical workloads based on their functions of service level agreements (SLAs), while attempting to optimize the usage of about-to-fail resources which are still expected to operate for at least some period of time.

Disaggregated System Description

Disaggregated computing systems provide flexibility and elasticity in constructing bare-metal computing systems for use in the cloud, to provide on-demand flexibility to cloud users, or "tenants". As mentioned, a disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload. This functionality is enabled by the use of point-to-point circuit wire level switching. All disaggregated system proposals currently known in the art are copy-based systems in which a process state is copied over a memory fabric to local memory at the computation hardware because of the latency in connecting directly to the pool over the memory fabric or over a symmetric multiprocessing (SMP) system. This means that switching between computing components cannot happen in milliseconds as can the point-to-point circuit wire level switching mechanisms used in the present invention thereby enabling a continuous, instantaneous execution of processes even while the computing components are switched.

One advantageous component of disaggregated computing systems is the opportunity to perform computation between various hardware resources in ways previously unattainable. For example, in most traditional pre-configured (fixed) computing systems, pre-fetching techniques and data locality help to keep cache hit rates high, enabling ultra-fast performance for the end user. However, if the processor spends a vast amount of time finding the needed data in the cache, it may be under-utilizing bandwidth to main memory. Since the disaggregated architecture permits additional processing components to be connected to various memory pool modules, a method to better utilize this bandwidth to memory modules is proposed by efficiently connecting to the memory modules from other processing components (during times of low usage) to perform analytic functions which may lead to valuable insights about the data, or its processing. Such memory access will not pass through the usual SMP fabric connecting processors, and hence does not disturb inter-processor communication and coherency when really needed, increasing efficiency further.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

By way of background, but not by way of limitation, the following describes a representative computer environment in which the techniques of this disclosure (described below) may be practiced.

Turning now to FIG. 1, exemplary architecture 10 of a general computing environment in which the disaggregated compute system of this disclosure may be implemented and/or comprised of is depicted. The computer system 10 (which may also be referred to as "cloud computing node" 10) includes CPU 12, which is connected to communication port 18 and memory device 16. The communication port 18 is in communication with a communication network 20. The communication network 20 and storage network may be configured to be in communication with computer systems (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

As previously eluded to, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage sub system 20).

Figure 2:
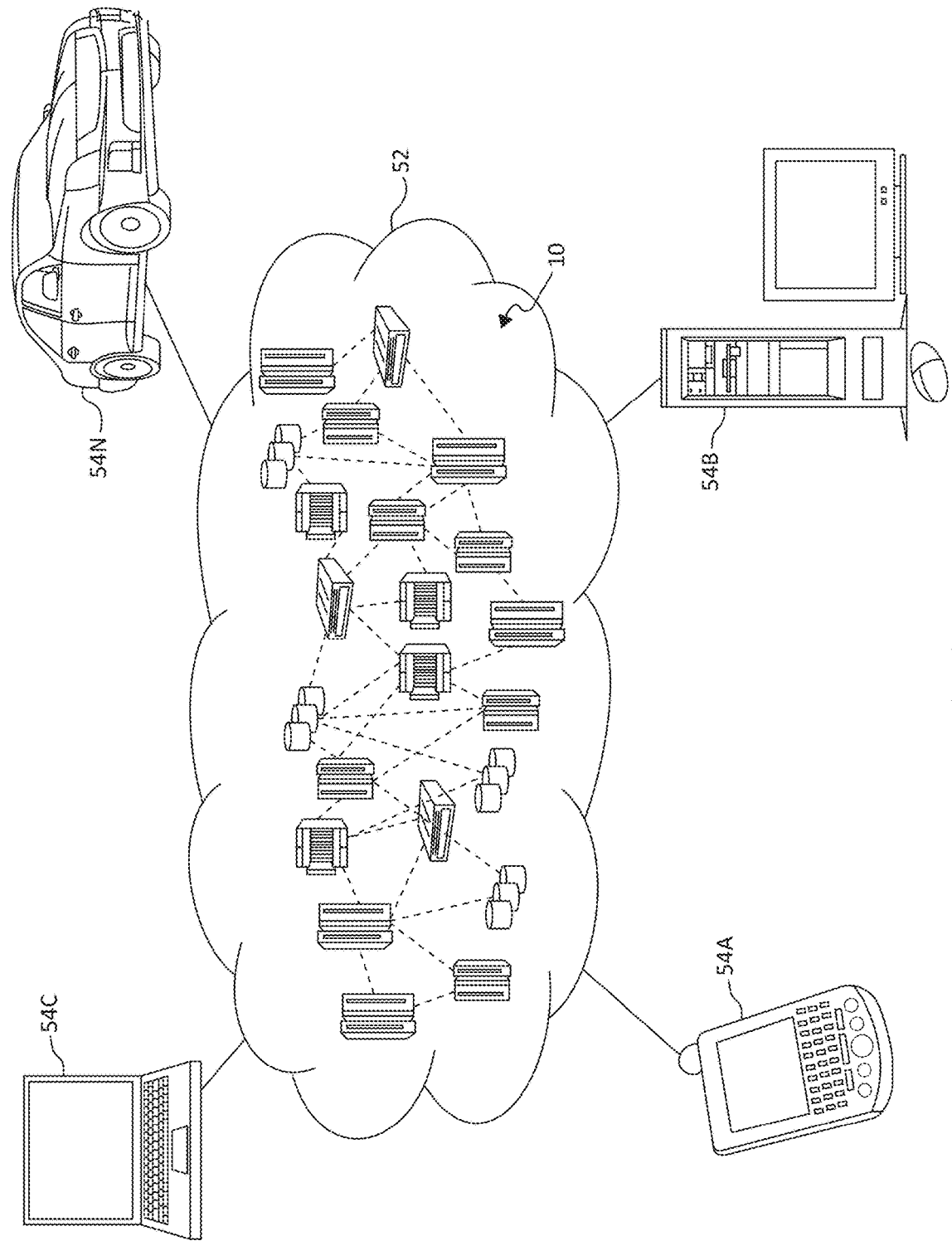
FIG. 2 is a block diagram depicting an exemplary cloud computing environment, according to aspects of the present invention.

Referring now to FIG. 2, illustrative cloud computing or disaggregated computing environment 52 is depicted. As shown, cloud computing environment 52 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 52 can communicate with any type of computerized device over any type of network and/or network addressable connection (e.g., using a web browser).

Figure 3:
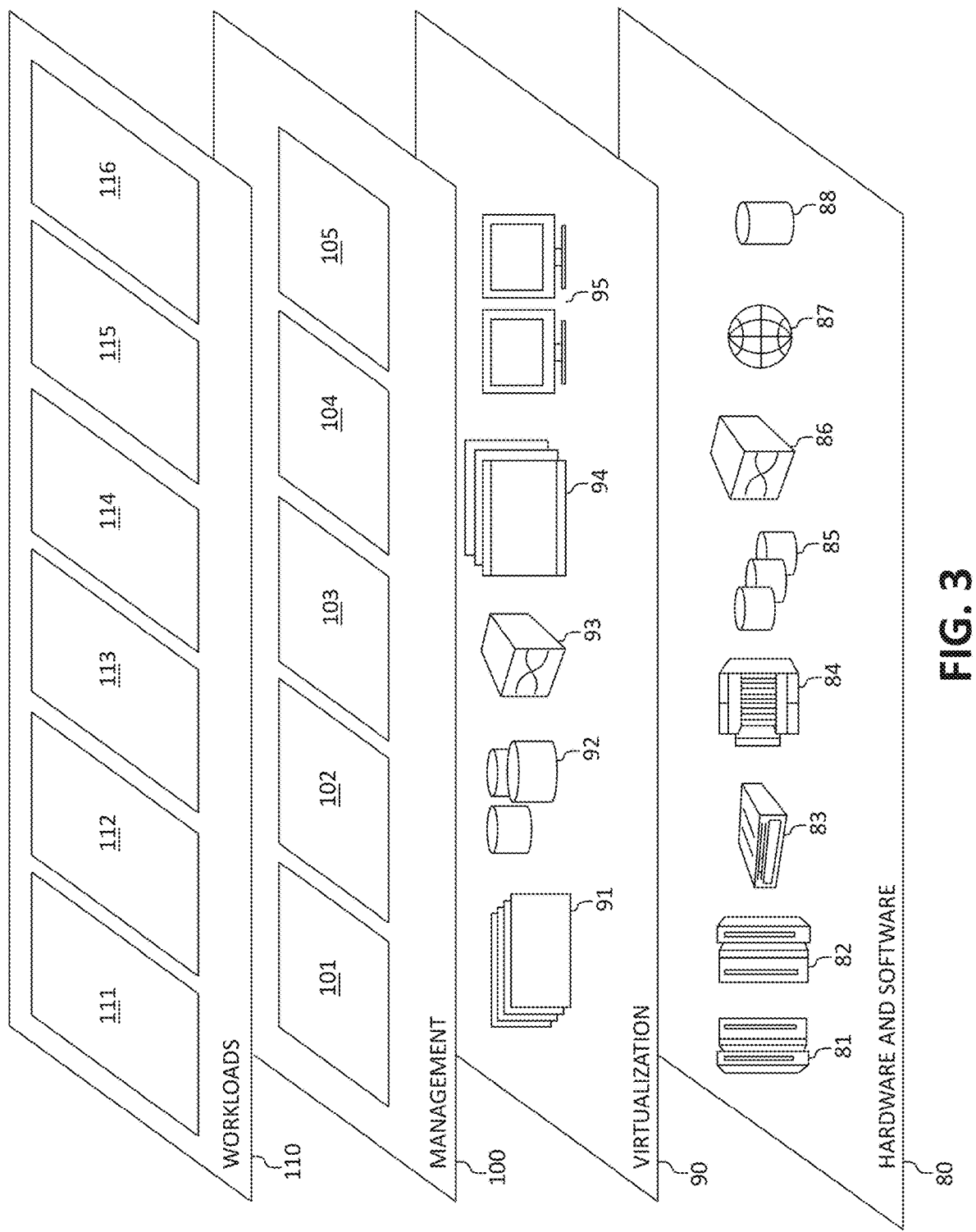
FIG. 3 is a block diagram depicting abstraction model layers, according to aspects of the present invention.

Referring now to FIG. 3, a set of functional abstraction layers provided by cloud computing environment 52 (FIG. 3) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111;

software development and lifecycle management 112; virtual classroom education delivery 113; data analytics processing 114; transaction processing 115; and, in the context of the illustrated embodiments of the present invention, various health check and resource diagnostic functionality 116. One of ordinary skill in the art will appreciate that the health check and resource diagnostic functionality 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 4:
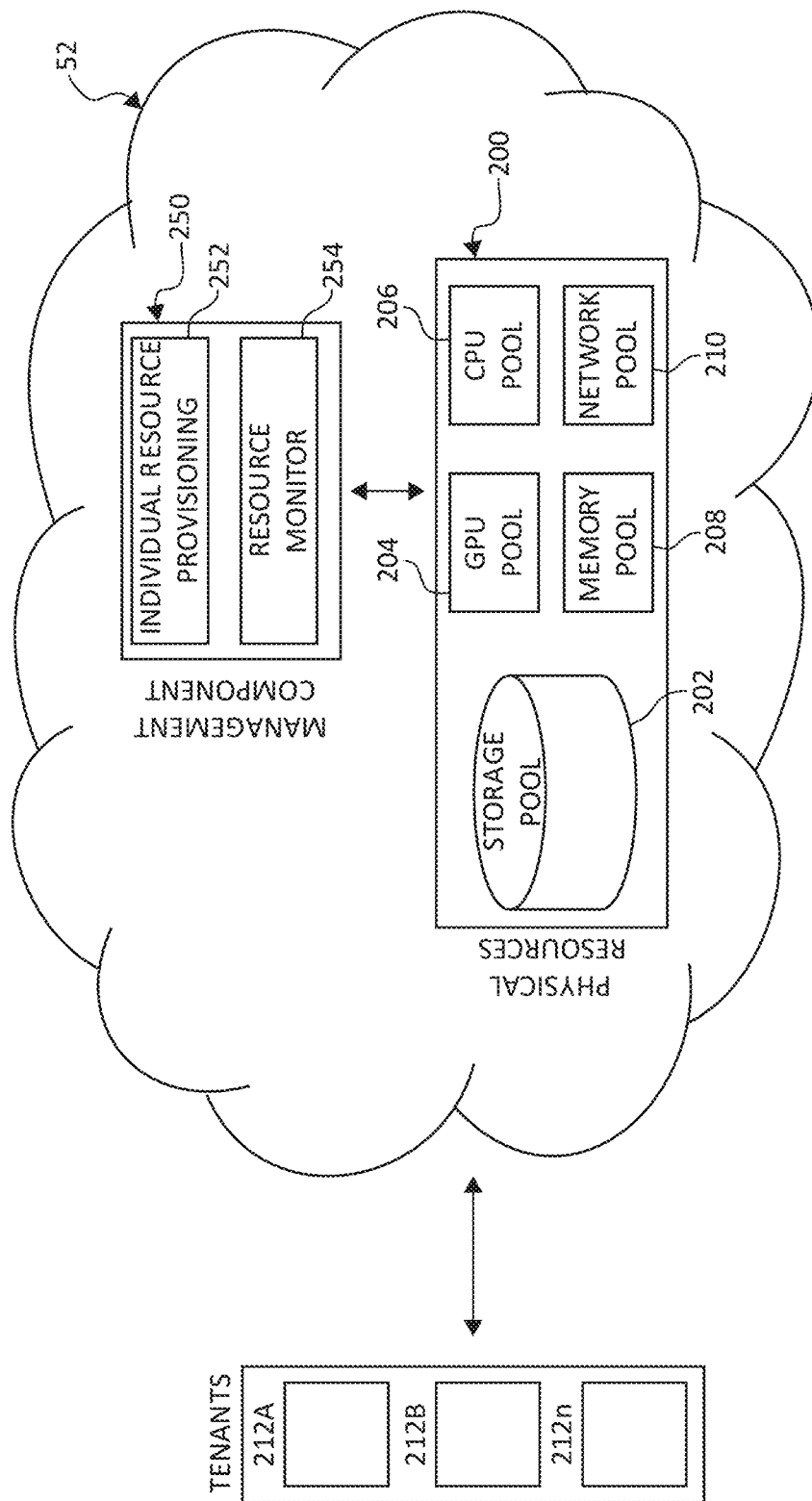
FIG. 4 is a block diagram depicting a hardware structure of a disaggregated computing environment, according to aspects of the present invention.

Turning now to FIG. 4, a block diagram of a disaggregated computing architecture is illustrated, of which is included in the cloud computing environment 52. Within cloud computing environment 52 is the disaggregated computing system comprising physical hardware resources 200. Physical hardware resources 200 may comprise of classifications of the hardware resources such as a storage device pool 202, a GPU device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein.

In communication with the cloud computing environment 52, the management module 250, and the physical hardware resources 200, are tenants 212A, 212B, and 212n. Tenants 212A, 212B, and 212n may communicate with the cloud computing environment 52 by way of the management module 250, and thus the physical resources 200 provided by any signal-bearing medium.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, and network pool 210, while staying in spirit and scope of the present invention. Additionally, the duties of the management module 250, and thus the components therein, may be performed and comprised of physical components, computer code, or a combination of such.

In one embodiment, the management module 250 interacts with individual tenants 212A-n to receive workload requests and locate the best suitable hardware resources for the given workload. Individual hardware resources of the physical hardware resources 200 are tracked and a mapping is maintained between each respective tenant 212A-n and respective assigned hardware resource. Each hardware resource is identified using a unique identifier. This identifier may be a physical identifier (e.g., barcode) and/or a virtual identifier (e.g., code based). The management module 250, or any other suitable modules or means known in the art may be used to accomplish these mechanisms.

Figure 5:
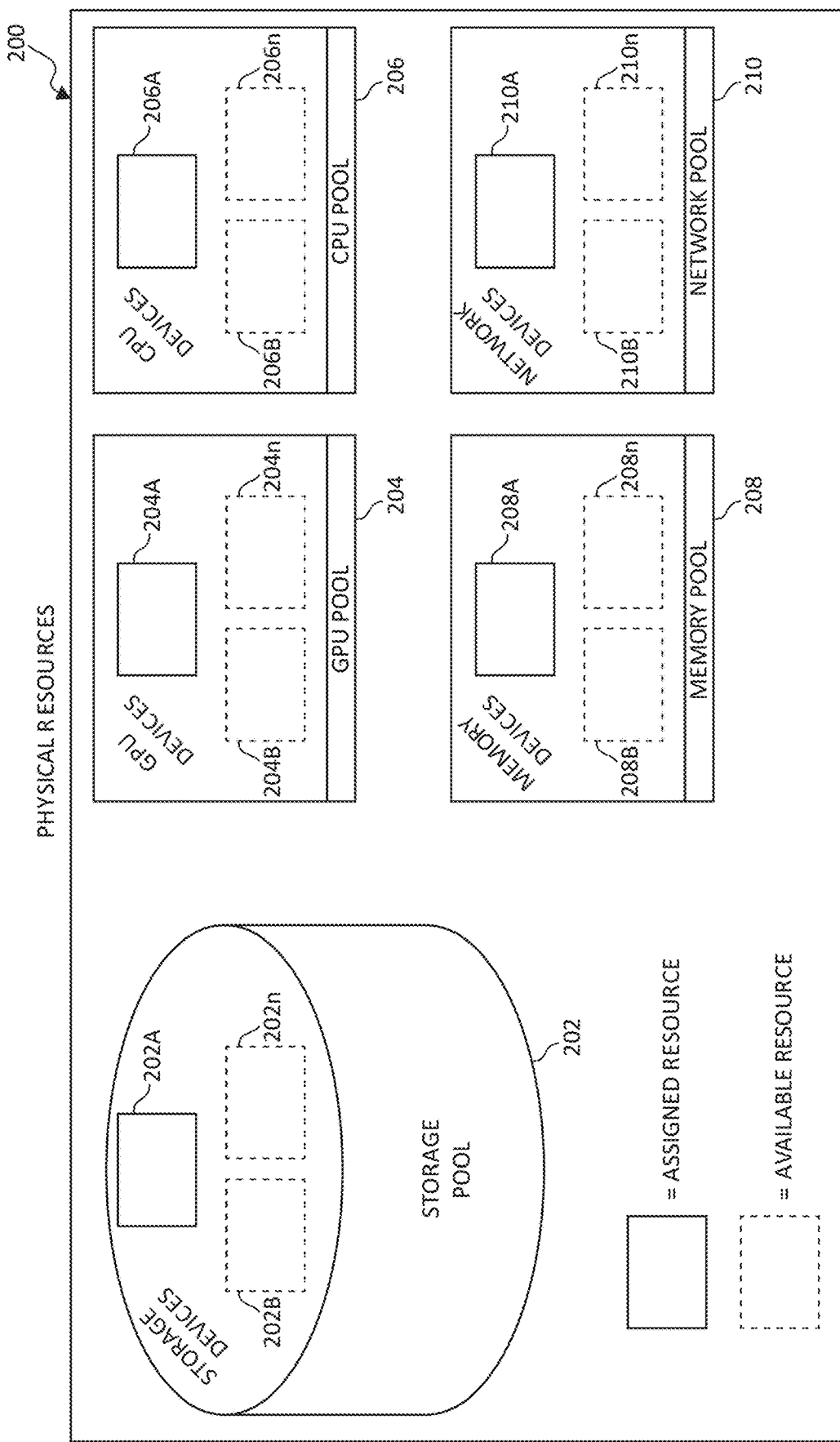
FIG. 5 is an additional block diagram depicting a hardware structure of a disaggregated computing environment, according to aspects of the present invention.

FIG. 5 is a block diagram illustrating the physical hardware resources 200 portion of FIG. 4. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n.

Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e., storage device 202A, GPU device 204A, CPU device 206A, memory device 208A, and network device 210A) are assigned hardware resources to one or more tenants (i.e., tenants 212A, 212B, 212n). Hardware resources appearing in dashed line (i.e., storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g., a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g., 1 meter) away in location. In another example, because the disaggregated system is not based on virtual components but rather physical components (i.e., actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Figure 6:
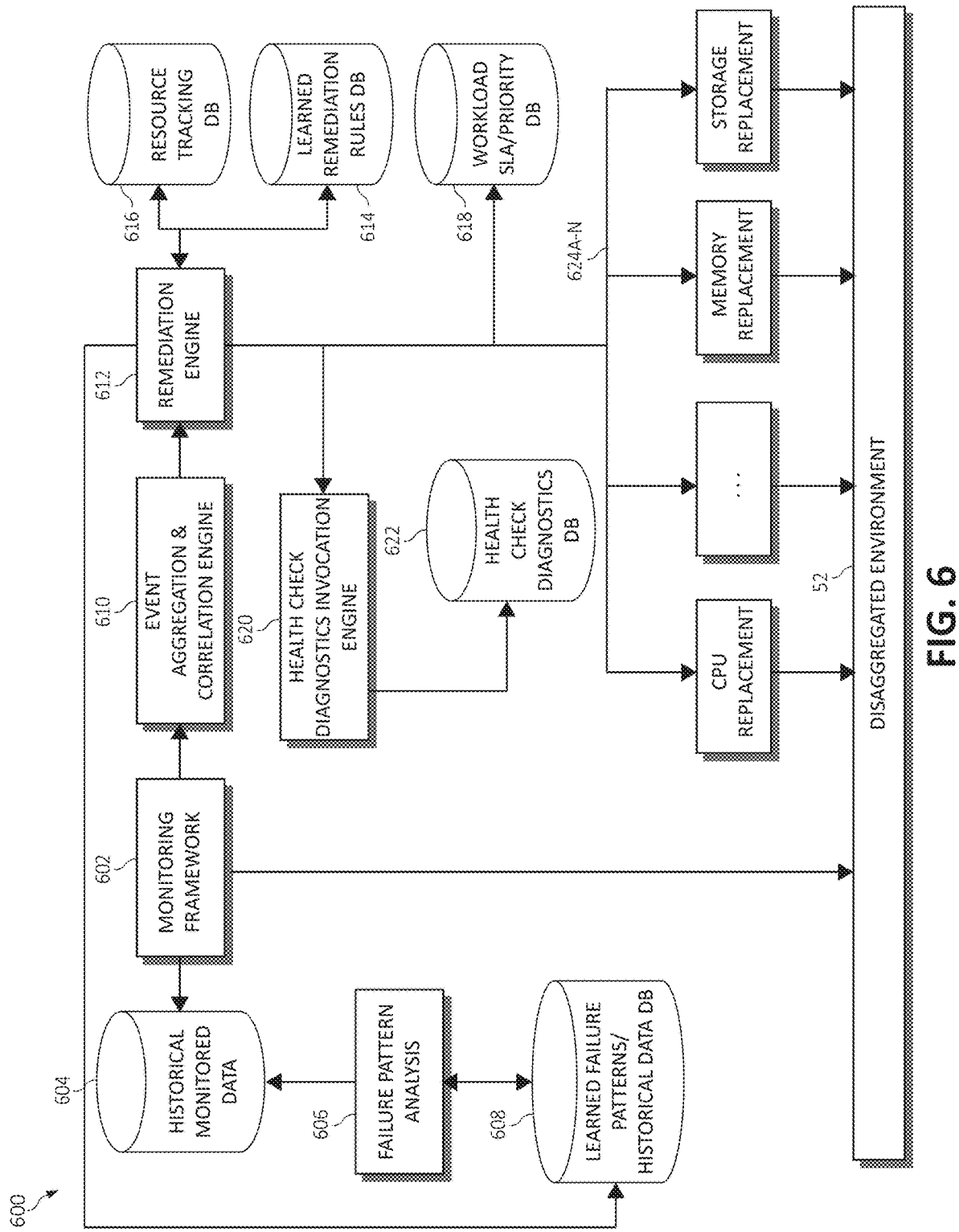
FIG. 6 is a block diagram depicting a component structure of a health check diagnostic system in a disaggregated computing environment, according to aspects of the present invention.

FIG. 6 is a block diagram depicting a component structure of a health check diagnostic system 600 commensurate with the disaggregated environments illustrated in FIGS. 4 and 5. In the illustrated embodiment, the system 600 may include a monitoring framework 602 which is responsible for monitoring the hardware resources 200 based on a variety of rules. In one embodiment, these rules may be statically defined (based on best practices). In another embodiment, the rules may be learned and updated in real-time as the system evolves. The monitoring framework 602 may be in communication with a historical monitored data database 604, which stores raw metrics collected from the monitoring framework 602, and which is used for various analyses (e.g., to learn failure patterns of various hardware resources 200). A failure pattern analysis component 606 may be provided to perform the various analyses and learning techniques from the historically collected data (metrics) stored in the historical monitored data database 604. To learn the failure patterns of the various hardware resources 200, the failure analysis component 606 may use various techniques to perform the analyses on the historically collected data, such as time series analysis, correlation, linear regression, machine learning, etc.

The learned failure patterns, as analyzed by the failure analysis component 606, may be stored in a learned failure pattern database 608. The learned failure pattern database 608 stores the learned failure patterns based on historical data collected from monitoring the disaggregated environment (i.e., cloud computing environment 52). The initial set of the learned failure patterns may have been inherited from the traditional server or disaggregated environment, which will evolve over time as new failure patterns are learned in the disaggregated environment. The learned patterns are continuously updated within the learned failure pattern database 608 based on the new monitoring data, the observed pattern of failures and failure pattern analysis of hardware resources 200.

In some embodiments, the monitoring framework 602 may be in communication with an event aggregation and correlation engine 610, which is responsible for performing event aggregation and correlation of certain events detected within the hardware resources 200 to determine if the event(s) have occurred above a defined threshold over a period of time. The event aggregation and correlation engine 610 may provide information regarding the detected events to a remediation engine 612, which orchestrates various action plans at different stages (e.g., component attachment, de-attachment, calling a health check diagnostics invocation engine 620 when comparing current resource behavior to the learned failure patterns, etc.). The remediation engine 612 may also be responsible for computing the probabilistic estimated time to failure (ETTF) of various hardware resources 200, and finally, updating a resource tracking database 616 with this information. A learned remediation rules mapping database 614 may also be provided to map remediation rules developed by the remediation engine 612 based on a workload's SLA/priority and/or the ETTF of an impacted hardware resource 200. A workload SLA priority database 618 may further be provided to store a respective SLA and priority for each input workload from a respective tenant 212A-n.

In some embodiments, the resource tracking database 616 may track a health status of each resource of the hardware resources 200. The resource tracking database 616 may store a resourceID, type (memory, CPU, GPU etc.), a resource status (e.g., PASS/FAIL health diagnostics), a dateFirstDeployedTimeStamp (i.e., a timestamp when the resource was first deployed), lastHealthCheckTimeStamp (i.e., a timestamp when the last health check was performed), the ETTF of the resource, a serverID (i.e., an identification of the server to which the resource is currently attached), a healthCheckTimer (i.e., a timer when the next health check will be invoked), a failureRate (i.e., a rate of resource failures of the particular type), and so on. Within this context, a FAIL status may indicate that a particular resource has failed the applied health check(s), the failure is permanent with the ETTF being close to 0 and unacceptable for workloads with any SLA/priority. In this scenario, a healthy and available replacement resource is assigned to the effected workload, as will be further described. Similarly, a PASS status may indicate that the particular resource passed the applied health check(s) and the ETTF is updated with the estimated probability value computed using the historically learned failure patterns.

The health check diagnostics invocation engine 620 may select appropriate health check policies from the learned remediation rules mapping database 614 and invoke these health check policies on a particular disaggregated server, and a health check diagnostics database 622 may store a database having a list of all the health check policies invoked by the health check diagnostics invocation engine 620. The health check diagnostics database 622 may be constantly updated based on new health check diagnoses that may become available as the system 600 learns new failure patterns. Finally, the CPU replacement, memory replacement, and storage replacement components, among others (collectively referred to as components 624A-n) may initiate and facilitate the replacement of various ones of the hardware resources 200 commensurate with the health check diagnostics as described herein.

Preemptive Deep Diagnostics of Resources

Figure 7:
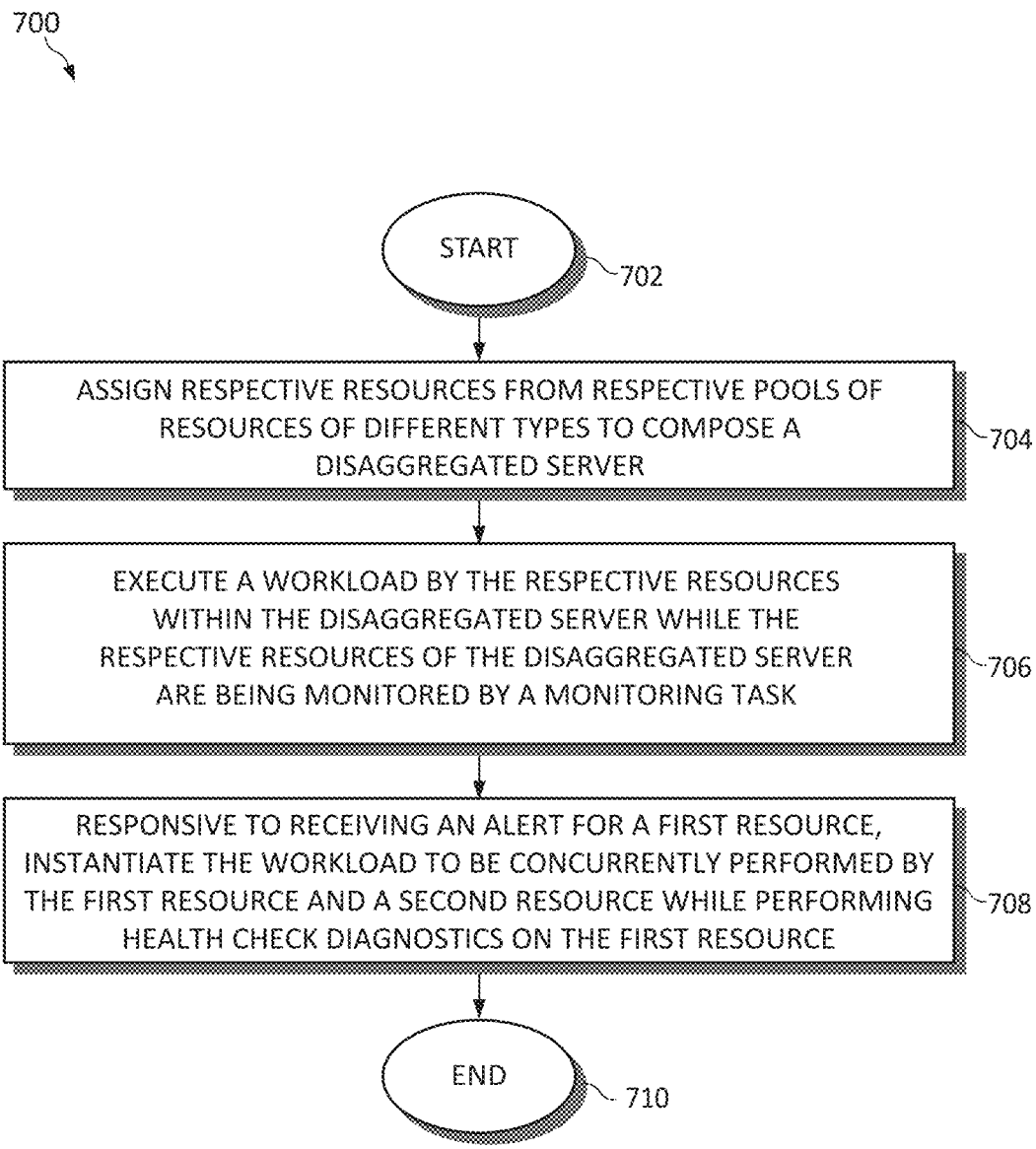
FIG. 7 is a flowchart diagram illustrating a method for preemptive deep diagnostics of resources in a disaggregated computing environment, according to aspects of the present invention.

FIG. 7 illustrates a method 700 for preemptive deep diagnostics of resources in a disaggregated computing environment. The method 700 (and all subsequent methods disclosed herein) may be performed in accordance with the present invention in any of the environments depicted in FIGS. 1-6, among others, in various embodiments. Of course, more or fewer operations than those specifically described in FIG. 7 may be included in the methods, as would be understood by one of skill in the art upon reading the present descriptions.

Each of the steps of the method 700 (and all subsequent methods disclosed herein) may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a CPU, an Application Specific Integrated Circuit (ASIC), a Field Programmable Gate Array (FPGA), etc., combinations thereof, or any other suitable computing device known in the art.

The method 700 begins (step 702) by assigning respective resources from respective pools of resources of different types to compose a disaggregated server (step 704). The workload is executed by the respective resources within the disaggregated server while the respective resources of the disaggregated server are monitored by a monitoring task (step 706). Responsive to a first resource of the respective resources generating an alert from the monitoring task, the workload is instantiated to be concurrently performed by the first resource and a second resource of the respective resources while initiating a health check diagnostic operation on the first resource (step 708). The method 700 ends (step 710).

To wit, in various embodiments illustrated herein, the purpose of the system is to monitor resource behavior and events, by the monitoring framework 602, while particular ones of the resources 200 are executing a tenant (user) workload. Upon breaching a defined threshold associated with a particular event, a known good resource is dynamically (in real time) assigned or allocated to the server determined to be affected (and the executing workload thereon is shifted to this known good resource), and the suspicious resource is isolated and attached to a diagnostics server (this server may be the same server the resource has previously been assigned to such that the resource is "disengaged" from the actual workload, or this server may be a separate, dedicated diagnostic server). In one case, and more specifically, the case of re-allocating the suspicious resource to the separate diagnostics server, performing the health diagnostics in an isolated environment is one of the few practical ways of doing so because generally a user may not want the service provider maintaining the servers to install such diagnostic software on their system (e.g., for data privacy reasons). Further, the service provider may not have the access to install health diagnostics related code on the SLA-bound server.

In another scenario, if the health diagnostics invoked from the isolated environment may not provide any meaningful insights (due to lack of full context of the primarily workload where the alert was experienced) as the problem still persists, the resource may be re-allocated to the original workload (on the same server as the executing workload) and another instance of the user's workload may be instantiated to be duplicately processed by the known good resource and the suspicious resource so that health diagnostics can be performed in the primary setting where the issue was first experienced. For example, the issue may have been identified with the processor, yet it may only occur in context of the user's code.

In yet another scenario, if the alert was raised on a processor of the server, then an additional healthy processor may be allocated to the server, yet the suspicious processor is not detached. Rather, user requests are copied and forwarded to both the healthy and suspicious processors, while only the healthy processor actually processes the requests and returns the results to the user. This is performed contemporaneously with the suspicious processor using the copy of the user's request as context for running the health diagnostics, as it may be relevant given the failure pattern detected. This allows a server with SLA-bound workload (e.g., with high criticality) to continue to perform its business as usual with the replaced resource, while the health check diagnostics are performed on the suspicious resource as it leverages the learned failure patterns to determine next actions to perform. Again, the server entities are continuously monitored using the monitoring framework 602, which detects problems on a specific resource (e.g. memory, CPU) allocated to the server based on the monitoring rules. Still again, there may be multiple levels of monitoring and thresholds that are maintained and readjusted based on the failure rate of a resource, and the set of health diagnostics that are invoked may be determined based on the failure pattern and results of health diagnostics previously performed.

Figure 8A:
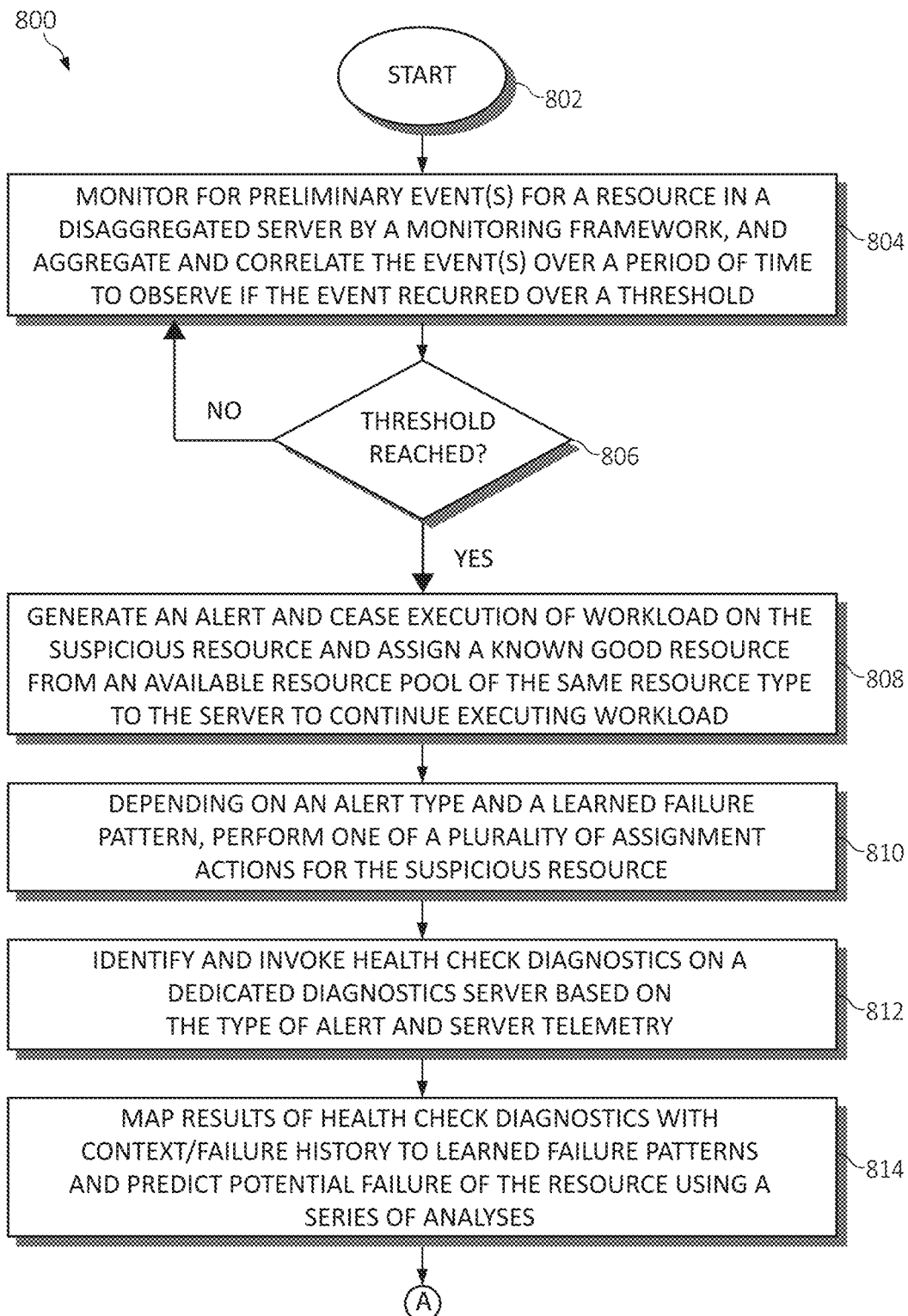
FIGS. 8A-8E are flowchart diagrams illustrating various methods for performing health check diagnostics in a disaggregated computing environment, according to aspects of the present invention.
Figure 8B:
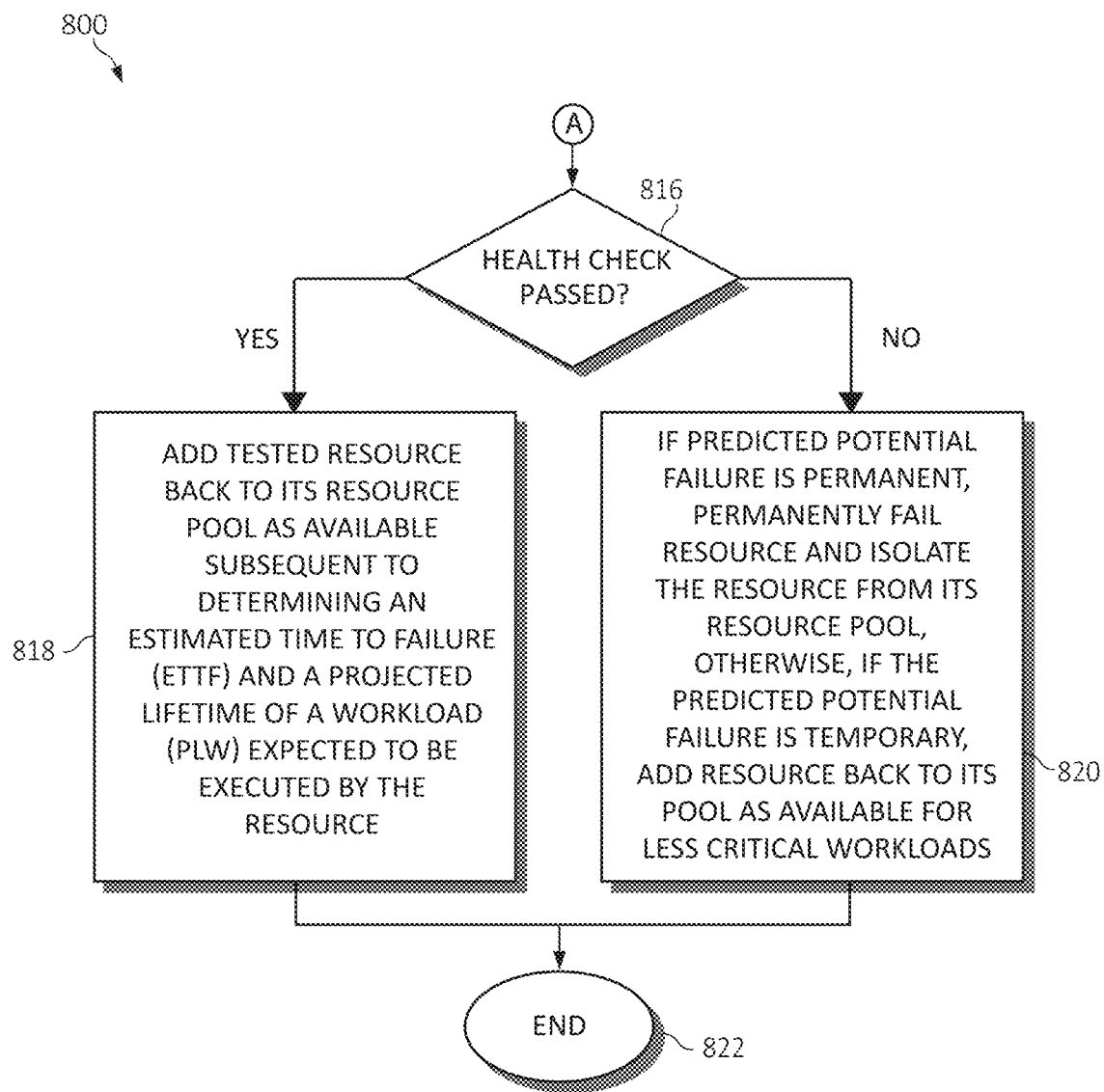

Continuing, FIGS. 8A-8E are flowchart diagrams illustrating various methods for performing health check diagnostics. Referring now to FIGS. 8A-8B, a method 800 is illustrated as an overview of the aforementioned diagnostic functionality of the disclosed system. The method 800 begins (step 802) by monitoring each of the hardware resources 200 of a particular server instance by the monitoring framework 602 for certain failure patterns or behavior event(s). These event(s) are aggregated and correlated over a defined period of time to observe if the event(s) occurred over a certain, defined threshold. The threshold may either be predefined based on best practices, assigned by the system administrator and/or could be learned based on the events generated from previously learned failure patterns (step 804). At step 806, a determination is made as to whether the event threshold has been reached for a particular resource. If the threshold has not been reached, the method 800 returns to monitoring for additional preliminary event(s) to correlate and aggregate with one another.

Returning to step 806, if the event threshold has been reached, an alert is generated and the workload(s) executing on the server instance are ceased on the suspicious resource, and a known good resource of the same type is selected from an available resource pool (of the hardware resources 200) to continue executing the workload. This proactive allocation of the healthy resource allows the user's workload to continue its operation without any downtime or disruption (step 808). Next, depending upon the alert type and the learned failure pattern (e.g., whether the context of where the failure occurred is needed), the system performs one of a plurality of assignment/health diagnostic actions for the suspicious resource (step 810), as will be discussed further in FIGS. 8C-8E. Upon performing one of the plurality of assignment/health diagnostic actions, the system then identifies and invokes health check diagnostics on a dedicated diagnostics server based on the type of alert generated and a server telemetry (i.e., the particular behavioral patterns generated by the suspicious resource on the server instance) (step 812).

Results of the health check diagnostics are then mapped with a context/failure history to learned failure patterns, which are used to predict potential failure of the resource using a series of analyses. That is, results of the health check diagnostics along with other context data (such as failure history of the resource) are mapped to the learned failure patterns to guide the system to identify the next steps. These next steps may involve invoking more rigorous health checks, failing the resource, or adding it back to the available resource pool (step 814). If the health check diagnostics have performed all the necessary health checks, based on the matching learned failure patterns, then the system predicts the potential failure using existing algorithms such as time series analysis, rule based, and pattern recognition analyses. A determination is then made as to whether the suspicious resource passed the health check diagnostics (step 816). If the suspicious resource did not pass the health check diagnostics, the predicted potential failure is determined to be either temporary or permanent. If the predicted potential failure is permanent, the suspicious resource is permanently failed and isolated from its resource pool such that it is not available for future provisioning requests (to another server instance). Otherwise, if the predicted potential failure is determined to be temporary, the suspicious resource is added back to its available resource pool to fulfill future provisioning requests, albeit the resource is identified to be available for less critical workloads (e.g., workloads having a very low or no SLA) (step 820). The method 800 then ends (step 822).

Returning to step 816, if the suspicious resource passed the health check diagnostics, the system prepares to add the tested resource back to its available resource pool (step 818) as follows: (a) The system estimates the projected lifetime of the workload (PLW), either based on similar workloads of the same type that are running in the environment or based on the user's input on how long the workload is planned to execute; (b) The system has a configurable threshold per SLA with a required buffer above the PLW (e.g., if the SLAs are referred to as "Platinum", "Gold", and "Silver" SLAs, then the ACCEPTABLE_ETTF_PLATINUM may be 50%, and the ACCEPTABLE_ETTF_GOLD may be 40%); (c) When a new provisioning request comes in, based on the predicted failure pattern of the resource and the context of the workload type (e.g., whether the workload is CPU-bound or memory-bound), the ETTF is dynamically computed and updated.

There are several schemes that may be leveraged for the allocation of the newly tested and measured resources. First, the system orders the resources with an ETTF greater than (PLW+PLW*ACCEPTABLE_ETTF_<SLA>). For example, if the workload has a platinum SLA and the ACCEPTABLE_ETTF_PLATINUM is 50%, and the project lifetime of workload (PLW) is 100 hours, then a resource with an ETTF of 150 hours (100+100*50%) is required for the given workload. In another case, a resource with a maximum ETTF (as long as it is greater than the PLW) is assigned to the workload with highest SLA (e.g., platinum). In yet another example, the newly measured resources having a minimum ETTF may be assigned to workloads with an opportunistic SLA (meaning the workloads are performed when convenient and do not have a particular priority) or no SLA. The method 800 ends (step 822).

Figure 8C:
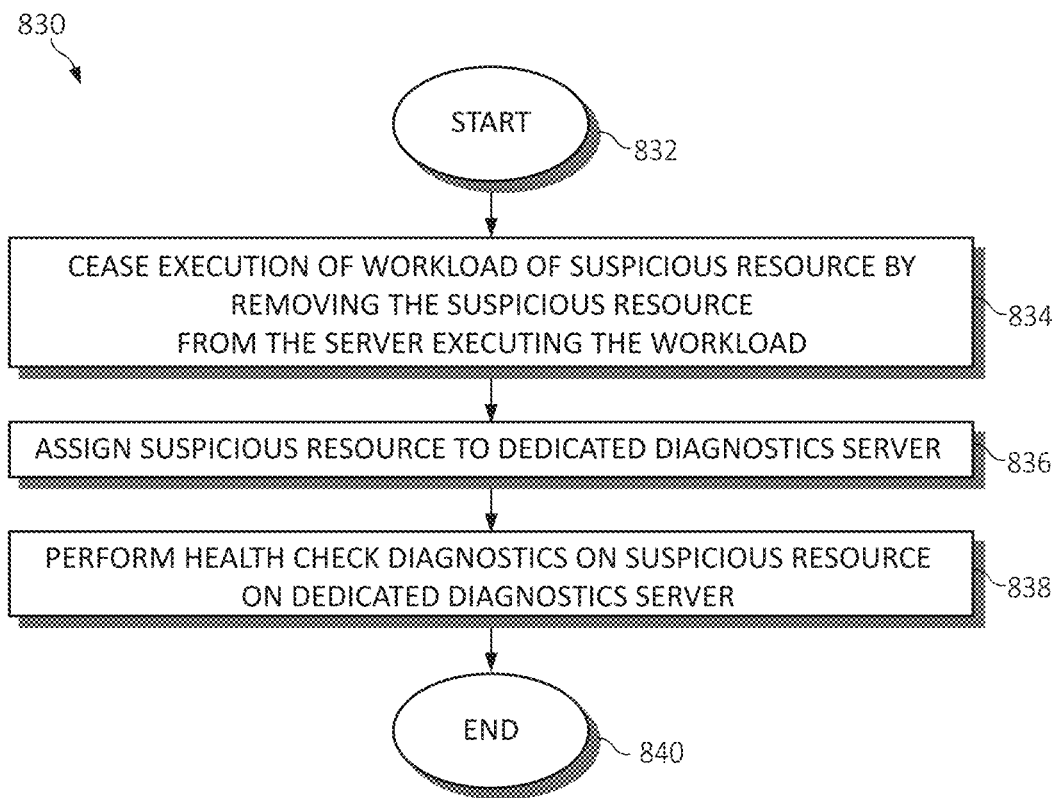

Referring now to FIG. 8C, method 830 illustrates one example of the plurality of assignment/health diagnostic actions performed for the suspicious resource as discussed in step 810 of method 800. Beginning at step 832, upon receiving the alert notification from the monitoring framework 602, the execution of a respective workload is ceased on the suspicious resource by removing the suspicious resource from the server executing the workload (step 834). The suspicious resource is then assigned to a separate, dedicated diagnostics server (step 836), and more rigorous health check diagnostics are performed on the suspicious resource on the dedicated diagnostics server (step 838). The method 830 ends (step 840).

Figure 8D:
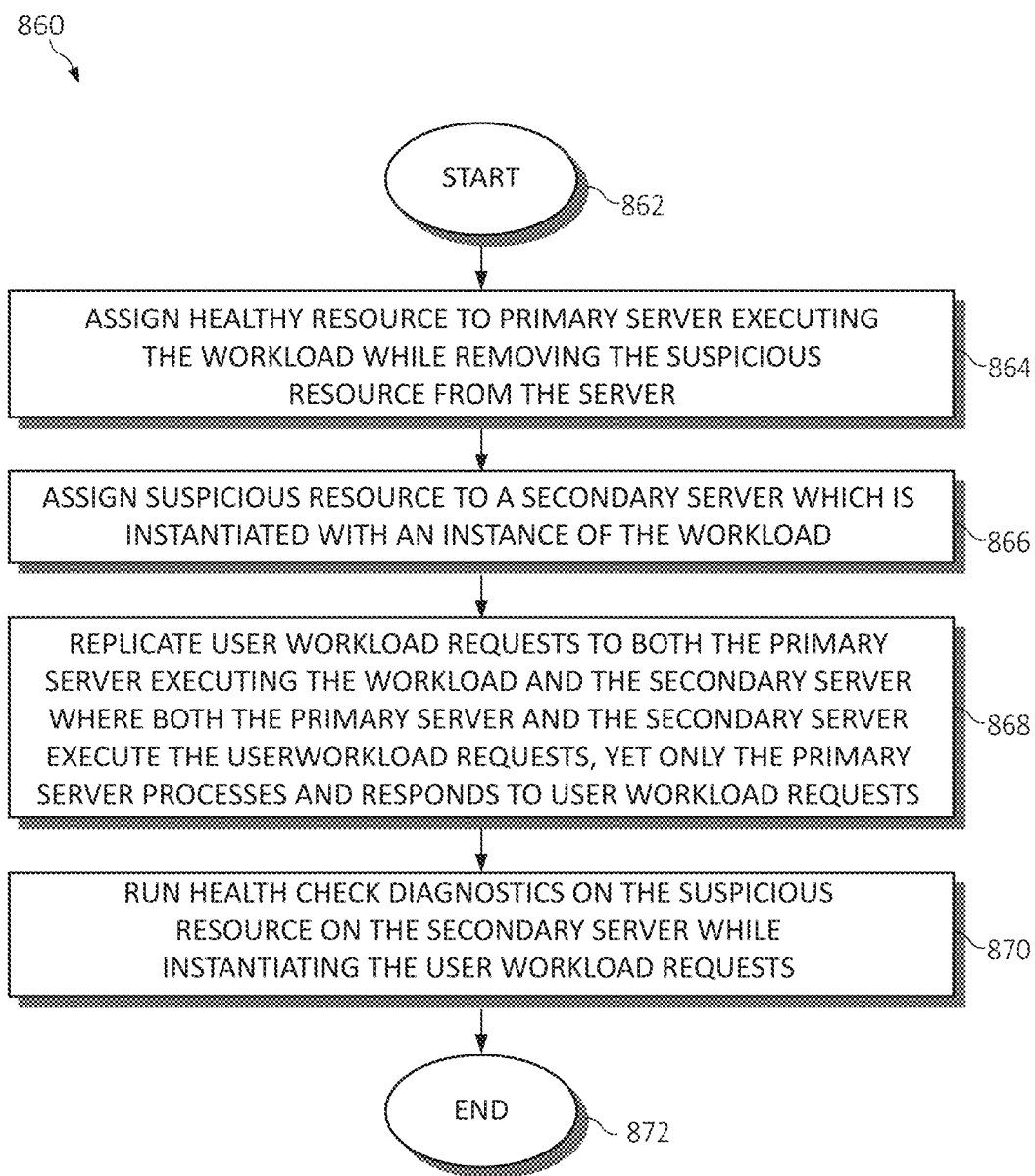

In another example of the plurality of assignment/health diagnostic actions, and referring now to the method 860 of FIG. 8D, a healthy resource is selected from an available resource pool (of the hardware resources 200). This healthy resource is assigned to the primary server instance executing the workload while the suspicious resource is removed from the server (step 864). The suspicious resource may then be assigned to a secondary server instance which is instantiated with an instance of the workload running on the primary server instance (step 866). Workload requests are then replicated to both the primary server instance and the secondary server instance, where both the primary and secondary servers execute the workload requests yet only the primary server actually processes and responds (returns results) to the workload requests (step 868). In other words, the isolated secondary server instance receives and processes the workload requests, however the results thereof are not returned to the user as the primary goal of the secondary server is to run deeper health diagnostics while imitating execution of the actual executing workload. Thus, the health check diagnostics are then run on the suspicious resource within the secondary server while instantiating the user workload requests (step 870). The method 860 ends (step 872).

Figure 8E:
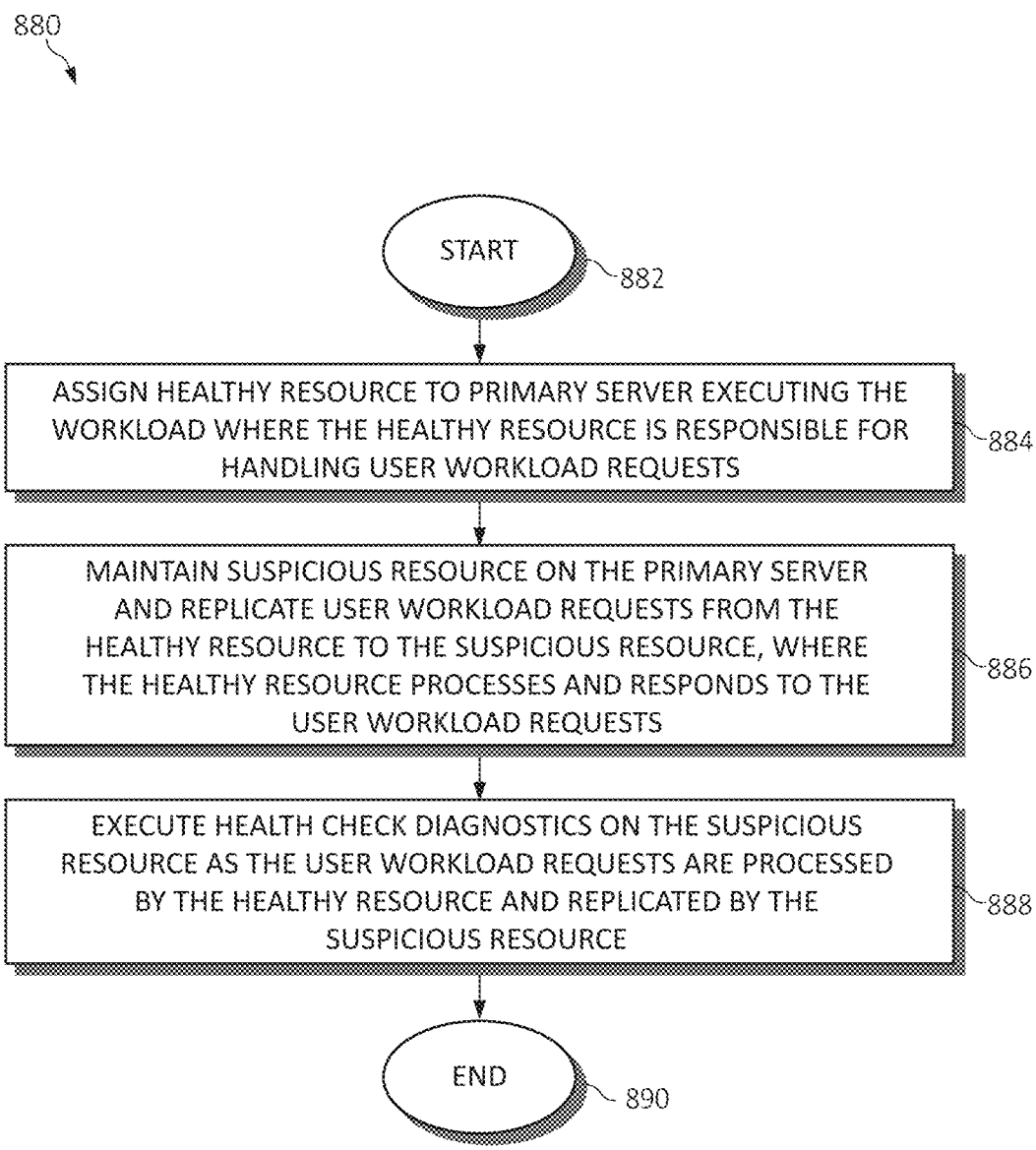

In still another example of the plurality of assignment/health diagnostic actions, and referring now to the method 880 of FIG. 8E, a healthy resource is selected from an available resource pool (of the hardware resources 200), and this healthy resource is responsible for handling user workload requests (step 884). The suspicious resource, however, is maintained on the primary server instance as a shadow which is primarily used to run the health check diagnostics within the context of the server instance in which the fault was detected (step 886). Thus, the health check diagnostics are executed on the suspicious resource on the primary server as the user workload requests are processed and returned by the healthy resource and these workload requests are replicated to the suspicious resource (which also processes the requests however does not return any output to the user) (step 888). The method 880 ends (step 890).

In modern datacenters, it is desirable to run resident systems as close to 100% utilization as possible due to the large capital investment in the servers, racks, cables, storage, etc. in addition to the software licensing cost included in such systems. Therefore, within the context of the disaggregated architecture, it is possible that there may be no hardware resources 200 available in a particular one of the resource pools (i.e., all hardware resources 200 are assigned to various tenants 212A-n). The assumption therefore is that there are often no resources left idle, and hence, when the resources need to be exchanged between disaggregated servers (e.g., a new resource needs to be allocated while de-allocating away a suspicious resource for health check purposes), if there are no resources available then the healthy resource may need to be taken away from the opportunistic or lower priority (criticality) workload and allocated to the higher priority workload.

Therefore, again, the considered system learns failure patterns of certain resources and certain resource types from historical data, which may have been already collected from the traditional physical server or the disaggregated environment. These patterns may change over time given the knowledge of the system (e.g. the model used, etc.). The system learns the correlation between patterns of failures with different parameters such as environment, memory, cache, and CPU; and uses rules (based on learning or previous domain knowledge) to identify the specific health diagnostics to be invoked on the server when an alert is generated for the suspicious resource. The system may run health diagnostics in a first instance to determine the health of the particular resource, however, the system also provides multiple levels of health diagnostics that may be iteratively applied depending on the results of the previous check. Depending on the results of the health check(s), the system takes appropriate next remediation actions, as previously discussed.

For example, consider that in one scenario, commensurate with identifying the learned failure patterns, a high temperature alert is received by the monitoring framework 602. Because the system also takes the appropriate next remediation actions in a learned order, in some cases, based on previous failures tied to a particular CPU, it may be recommended to initiate the health check diagnostics by running deep diagnostic tests related to the particular CPU. Diagnostic analysis/testing of the CPU may be performed to check whether the CPU is heating abnormally to its known normal behavior (e.g., while executing I/O intensive workloads), and different codes may be invoked on different portions of the CPU to determine a specific problem area. That is, high intensity workloads, for example, may be performed on the different portions of the CPU to largely exercise these portions to identify the source of the alert.

In another example, based on previous failures known by the learned failure patterns, the high temperature alert may be highly correlated with fan failure. In this case, each fan may be isolated and tested to determine a speed in which each fan is rotating. Further, different simulations may be performed (similar to the highly intensive I/O workload scenario) to detect certain patterns under which the fan is failing or underperforming.

In yet another example, based on previous known failures, the high temperature alert may be highly correlated with certain memory resources (e.g., DIMMs). Similarly again, these components may be put under test to determine a specific source and pattern of underperformance and failure to isolate the problem. In this way, the system may correlate each of the aforementioned examples (the CPU, fan, and memory resources) to add data points to the learned failure patterns for future use in quickly isolating a given problem having a certain known pattern. If at any point the issue is addressed and the alert does not reappear, the system may use this data as input to the pattern analysis for optimizing the learned failure patterns. That is, if the high temperature alert is generated and the system recommends to replace the fan based on the correlation, for example, if the high temperature alert does not reappear subsequent to replacing the fan, the system may use this information as a data point in learning the learned failure patterns for future analyses.

Offline Steps

In various embodiments, the failure patterns of the various resources and resource types are learned offline (i.e., while not executing a workload). These patterns are learned from historical data that may be collected from the server instances running in the disaggregated (or traditional) datacenter environment. Monitoring rules and thresholds are defined based on the learned failure patterns and the particular resource or resource type's failure rate.

Defined Thresholds

For learning the failure patterns of the particular resource or resource type, the following rules and thresholds may be defined:

HEALTH_CHECK_RESULT comprises a result of the health check diagnostics.

EXPECTED_TIME_TO_FAILURE (ETTF) comprises a probability of the failure type on resource x given the workload type A. For example, if one of the CPUs of a server instance raised an alert and the workload is CPU-bound (heavily reliant on the CPU), then the ETTF for this CPU is shorter versus if the workload were to be memory-bound (heavily reliant on memory). If the workload were to be memory-bound, then the ETTF for the CPU may be longer (i.e., the CPU may have more operational life). Hence a CPU with a short ETTF may be reallocated based on the workload type to other workloads which may be less reliant on extensive CPU processing.

ACCEPTABLE_ETTF_<SLA> comprises a threshold per SLA that defines the minimum ETTF acceptable for the particular SLA (where the SLA could be platinum, gold, silver, etc.). For example, for a platinum SLA workload, the threshold may be 50%, for a gold SLA workload, the threshold may be 30%, and so on. This a configurable threshold, which may be adjusted based on the failure pattern learning or it may be statically defined (based on best practices or by the user).

RESOURCE_STATUS—PASS, FAIL comprises the output status of the resource health check diagnostics. PASS is indicated if the result of the health check diagnostics is pass and the ETTF is above the ACCEPTABLE_ETTF_<SLA> of any SLA; and FAIL is indicated if the result of the health check diagnostics is fail and/or the ETTF is too low. For example, if the workload's SLA is platinum, then RESOURCE_STATUS will be set to pass if the ETTF is 50% (ACCEPTABLE_ETTF_GOLD is greater than the PLW).

Online Steps

In some embodiments, and in accordance with various steps described in the method 800 of FIG. 8A, the following actions may be performed while the system is online (e.g., executing a workload): (a) Initially, the monitoring framework 602 monitors each server instance and raises an event when a predefined monitoring rule is detected (as specified in the learned remediation rules component 614) indicating a preliminary (predictive) failure on the server. (b) The event aggregation and correlation engine 610 then may receive the indicated event, and aggregates and correlates this event with other events over a period of time to observe if the event reoccurred above a certain threshold (e.g., over a certain frequency). If the event has breached a threshold then the event is forwarded to the remediation engine 612. (c) The remediation engine 612 then locates and attaches a known good resource from the available resource pool of the hardware resources 200, where the known good/healthy resource has an ETTF greater than the PLW+ PLW*ACCEPTABLE_ETTF_<SLA>. Each SLA type has an ACCEPTABLE_ETTF_SLA threshold pre-configured. For a CPU resource (i.e., one of the CPU devices 206A-n), the caches need to be flushed and for a memory resource (i.e., one of the memory devices 208A-n), the dirty data needs to be written back to its respective resource pool (i.e., memory pool 208).

The remediation engine 612 then assigns an available resource from the respective resource pool of the same resource type to the workload per the requirement of the workload. If no resources with the required ETTF are available in the respective resource pool (e.g., all resources in the pool have been assigned to respective server instances/tenants), then the remediation engine 612 identifies a lower priority workload (i.e., a workload having a lower priority SLA—"workload B") from which the resource may be taken away and re-allocated to the impacted server instance. The lower priority workload may be running an opportunistic workload in one scenario, which may be hibernated. In another case, the lower priority workload may have execute on a resource which may have the resource assigned with the desired ETTF (>ACCEPTABLE_ETTF-_GOLD) which is better suited for the impacted workload ("workload A") based on the PLW. In such a case, the resource may be swapped, where the resource with the high ETTF that was originally assigned to workload B is now allocated to the workload A, and the resource that was assigned to workload A is allocated to workload B (as long as the ETTF of the resource is greater than PLW+ PLW*ACCEPTABLE_ETTF_<SLA> of workload B).

(d) Commensurate with performing the re-allocation, the remediation engine 612 detaches (de-allocates) the suspicious resource from the server running the SLA-bound workload and attaches it to the dedicated diagnostics server for further health checking. (e) The remediation engine 612 then forwards the event to the health check diagnostics invocation engine 610. (f) The health check diagnostics invocation engine 610 uses this event data to identify the particular set of health check diagnostics that need to be invoked. (g) Finally, the remediation engine 612 receives the results of performing the health check diagnostics on the suspicious resource from the health check diagnostics invocation engine 610 and consults with the learned failure patterns database 608 to determine the next appropriate action. In one case, the remediation actions may include running more elaborate health checks. In another case, remediation engine 612 may have reached the final step and therefore would compute the ETTF of the tested resource based on probability statistics learned from the failure pattern analysis component 606 and stored in the learned failure pattern database 608.

Sample Action Plan

Upon performing the health check diagnostics on a suspicious resource, if the HEALTH_CHECK_RESULT=success, then the resource tracking database 616 is updated for the resource (including setting RESOURCE_STATUS=PASS, adding a lastHealthCheckTimeStamp and ETTF information to the resource, and resetting the resource healthCheckTimer). The tested resource is then added back to the available resource pool.

Conversely, if the HEALTH_CHECK_RESULT==fail, then the resource tracking database 616 is updated for the resource (including setting RESOURCE_STATUS=FAIL, adding a lastHealthCheckTimeStamp and ETTF information to the resource, and resetting the healthCheckTimer). Subsequently, the remediation engine 612 schedules the resource to be isolated to the failed group (where the resource is isolated from the available pool of resources).

Resource Replacement Scheme

Figure 9:
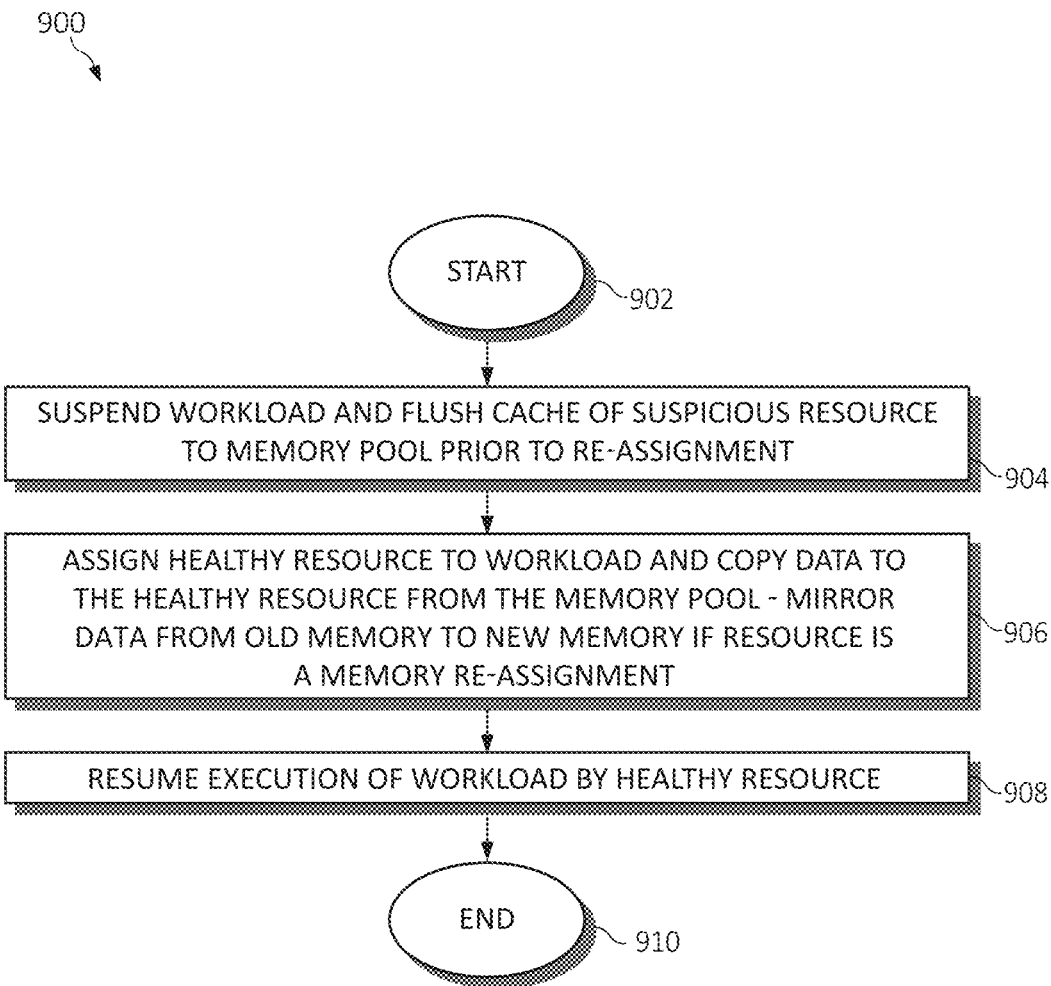
FIG. 9 is a flowchart diagram illustrating a method for performing resource replacement in a disaggregated computing environment, according to aspects of the present invention.

FIG. 9 is a flowchart diagram illustrating a method 900 for performing resource replacement in accordance with the concepts as previously discussed. For resources such as CPUs with cache memory, memory cache, and GPUs with local video memory replacement-before the CPU/memory cache/GPU memory is removed, these components need to flush their caches back to the memory pool (e.g., memory pool 208) before being re-allocated to another server instance (especially considering resources with large states, such as memory and storage resources). Therefore, beginning at step 902, the executing workload associated with the particular resource is suspended, and the CPU/GPU replacement system copies/flushes the cache data or GPU memory quickly to the main memory pool (e.g., memory pool 208) (step 906). In the disaggregated system, this is done with the point-to-point connection discussed previously because the CPU/accelerator is connected with a direct link to the memory pool. Because of the disaggregated architecture, the interruption to the executing workload is extremely small (e.g., at a millisecond level), much like a server hibernate operation. The new CPU (or other resource) is then connected, loads the appropriate data from memory, and resumes execution of the workload (step 908).

Returning to step 906, if the resource re-allocation entails memory replacement (e.g., for a case of memory related failure), the data needs to be mirrored to the new memory resource. There are generally three such cases: (a) Case 1: Replacement within the same memory pool controller in a memory pool drawer; (b) Case 2: Replacement between different memory pool controllers within the same memory pool drawer because, (i) the memory controller itself is faulty and/or (ii) there is insufficient space within the same memory controller, however sufficient space exists in another memory controller within the same memory drawer; and (c) Case 3: Replacement across memory drawers. This will require a copy between a first memory drawer to a second memory drawer if there is not enough available memory and/or controllers within the same drawer to perform the replacement. It should be noted that memory and storage replacement use similar techniques since the difference is merely the type of memory used (e.g., memory DIMMs vs. Flash or Phase Change Memory (PCM) devices). The method 900 ends (step 910).

In some embodiments, when considering the resource replacement scheme of the suspicious resource, various substitution plans may be implemented. To wit, upon determining failures, faults or alerts have been generated for a predetermined percentage of resources, the suspicious resources may be grouped into a same resource pool (or drawer) such that the suspicious resources may be replaced or serviced at a single time according to a particular maintenance plan. In other words, the known good resources reallocated to the affected workloads may be selected (among other considerations such as the SLA considerations discussed previously) from resource pools or drawers having the fewest faults or alerts, thereby attempting to isolate the suspicious or failed resources into a fewest number of resource pools or drawers.

In this way, a substitution plan may be implemented which consolidates group usage of both the known good and suspicious resources. Consider a scenario where resource drawer A has zero alerts/faults, and resource drawer B has n alerts/faults. In this case, the system may plan the substitution using resource drawer A to optimize the usage of the resources in resource drawer A while isolating affected resources to resource drawer B. By doing so, the system optimizes the replacement of the grouping of resources sharing a resource pool (out of many resource pools or drawers of the same resource type) to maximize imperfect resource usage while minimizing a labor and replacement cost associated with replacing faulty components. Further, when reallocating the workload from the suspicious or failed resources to the known good resources, the system may consider a geo-specific cost of labor as to a geographic location of where the suspicious or faulty resources reside and the geographic location of where the data output of the workload will be (or should optimally be). That is, a balance is attempted to be struck between reallocating known good resources which may incur additional latency to the workload because of their physical locality, and the geographic location of grouping the suspicious or failed resources for servicing. For optimizing the cost of labor, component replacement activities (e.g., by a service technician physically replacing the components within the resource drawer (s)) should be grouped as much as is practical to achieve a maximum benefit out of the cost of labor.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for preemptive deep diagnostics of resources in a disaggregated computing environment, by a processor, comprising:
    assigning respective resources from respective pools of resources of different types to compose a disaggregated server;
    executing a workload by the respective resources within the disaggregated server while the respective resources of the disaggregated server are monitored by a monitoring task; and
    responsive to a first resource of the respective resources generating an alert from the monitoring task, instantiating the workload to be concurrently performed by the first resource and a second resource of the respective resources while initiating a health check diagnostic operation on the first resource.

2. The method of claim 1, further including receiving one or more monitored events from the monitoring task as the monitoring task monitors the first resource;
    aggregating and correlating the one or more monitored events over a period of time and determining at least one threshold for the one or more monitored events for the first resource; and
    determining that the first resource has crossed the threshold and triggering the alert.

3. The method of claim 1, further including duplicating user requests associated with the workload for performance by both the first resource and the second resource.

4. The method of claim 3, further including ceasing responding to the user requests associated with the workload by the first resource, and transferring responsibility for responding to the user requests to the second resource.

5. The method of claim 1, wherein the health diagnostic operation is initiated on the first resource within the disaggregated server while concurrently performing the instantiated workload.

6. The method of claim 1, wherein the health diagnostic operation is initiated on the first resource within an alternative disaggregated server while concurrently performing the instantiated workload.

7. The method of claim 1, wherein performing the health diagnostic operation on the first resource further includes monitoring the first resource during the performance of the instantiated workload to determine a source of the alert, and mapping the source of the alert to a learned set of failure patterns.

8. A system for preemptive deep diagnostics of resources in a disaggregated computing environment, comprising:
a processor executing instructions stored in a memory device; wherein the processor:
assigns respective resources from respective pools of resources of different types to compose a disaggregated server;
executes a workload by the respective resources within the disaggregated server while the respective resources of the disaggregated server are monitored by a monitoring task; and
responsive to a first resource of the respective resources generating an alert from the monitoring task, instantiates the workload to be concurrently performed by the first resource and a second resource of the respective resources while initiating a health check diagnostic operation on the first resource.

9. The system of claim 8, wherein the processor receives one or more monitored events from the monitoring task as the monitoring task monitors the first resource;
aggregates and correlates the one or more monitored events over a period of time and determining at least one threshold for the one or more monitored events for the first resource; and
determines that the first resource has crossed the threshold and triggering the alert.

10. The system of claim 8, wherein the processor duplicates user requests associated with the workload for performance by both the first resource and the second resource.

11. The system of claim 10, wherein the processor ceases responding to the user requests associated with the workload by the first resource, and transfers responsibility for responding to the user requests to the second resource.

12. The system of claim 8, wherein the health diagnostic operation is initiated on the first resource within the disaggregated server while concurrently performing the instantiated workload.

13. The system of claim 8, wherein the health diagnostic operation is initiated on the first resource within an alternative disaggregated server while concurrently performing the instantiated workload.

14. The system of claim 8, wherein performing the health diagnostic operation on the first resource further includes monitoring the first resource during the performance of the instantiated workload to determine a source of the alert, and mapping the source of the alert to a learned set of failure patterns.

15. A computer program product for preemptive deep diagnostics of resources in a disaggregated computing environment, by a processor, the computer program product embodied on a non-transitory computer-readable storage medium having computer-readable program code portions stored therein, the computer-readable program code portions comprising:
an executable portion that assigns respective resources from respective pools of resources of different types to compose a disaggregated server;
an executable portion that executes a workload by the respective resources within the disaggregated server while the respective resources of the disaggregated server are monitored by a monitoring task; and
an executable portion that responsive to a first resource of the respective resources generating an alert from the monitoring task, instantiates the workload to be concurrently performed by the first resource and a second resource of the respective resources while initiating a health check diagnostic operation on the first resource.

16. The computer program product of claim 15, further including an executable portion that receives one or more monitored events from the monitoring task as the monitoring task monitors the first resource;
an executable portion that aggregates and correlates the one or more monitored events over a period of time and determining at least one threshold for the one or more monitored events for the first resource; and
an executable portion that determines that the first resource has crossed the threshold and triggering the alert.

17. The computer program product of claim 15, further including an executable portion that duplicates user requests associated with the workload for performance by both the first resource and the second resource.

18. The computer program product of claim 17, further including an executable portion that ceases responding to the user requests associated with the workload by the first resource, and transfers responsibility for responding to the user requests to the second resource.

19. The computer program product of claim 15, wherein the health diagnostic operation is initiated on the first resource within the disaggregated server while concurrently performing the instantiated workload.

20. The computer program product of claim 15, wherein the health diagnostic operation is initiated on the first resource within an alternative disaggregated server while concurrently performing the instantiated workload.

21. The computer program product of claim 15, wherein performing the health diagnostic operation on the first resource further includes an executable portion that monitors the first resource during the performance of the instantiated workload to determine a source of the alert, and maps the source of the alert to a learned set of failure patterns.

* * * * *